US012744698B2

(12) United States Patent
Li et al.

(10) Patent No.: US 12,744,698 B2
(45) Date of Patent: Sep. 22, 2026

(54) METHOD AND DEVICE FOR SENDING CONFIGURATION INFORMATION, COMMUNICATION DEVICE, AND STORAGE MEDIUM

(71) Applicant: Beijing Xiaomi Mobile Software Co., Ltd., Beijing (CN)

(72) Inventors: Yanhua Li, Beijing (CN); Ting Fu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 246 days.

(21) Appl. No.: 18/835,429

(22) PCT Filed: Feb. 12, 2022

(86) PCT No.: PCT/CN2022/076116
§ 371 (c)(1),
(2) Date: Aug. 2, 2024

(87) PCT Pub. No.: WO2023/151055
PCT Pub. Date: Aug. 17, 2023

(65) Prior Publication Data

US 2026/0180642 A1 Jun. 25, 2026

(51) Int. Cl.
*H04L 27/26* (2006.01)

(52) U.S. Cl.
CPC .................................. *H04L 27/261* (2013.01)

(58) Field of Classification Search
CPC ........................................... H04L 27/261–2613
See application file for complete search history.

(56) References Cited

U.S. PATENT DOCUMENTS

2020/0304263 A1 9/2020 Zhang et al.
2021/0321443 A1 10/2021 Takeda et al.
2023/0199778 A1* 6/2023 Xu ........................ H04L 5/0094 370/329

FOREIGN PATENT DOCUMENTS

CN 109391391 A 2/2019
CN 111867074 A 10/2020

OTHER PUBLICATIONS

MediaTek Inc., "RRC Message Size Evaluation on CSI-MeasConfig." 3GPP TSG-RAN WG2 Meeting #103, R2-1811335, 3GPP, 2018.*
International Search Report issued Oct. 31, 2022 in PCT/CN2022/076116, filed on Feb. 12, 2022, 4 pages.
Chinese Office action issued Jul. 26, 2024 in CN 202280000444.8, 19 pages (with English Translation).

(Continued)

*Primary Examiner* — Brendan Y Higa
(74) *Attorney, Agent, or Firm* — Oblon, McClelland, Maier & Neustadt, L.L.P.

(57) ABSTRACT

Embodiments of the present application provide a method for sending configuration information. The method is performed by a base station and includes sending configuration information of a predetermined reference signal, where the predetermined reference signal includes at least one of: a Tracking Reference Signal (TRS); or a Channel-State Information Reference Signal (CSI-RS); and a field length of an Information Element (IE) for indicating the configuration information is within a predetermined range.

18 Claims, 13 Drawing Sheets

Terminal

Base station

Step 21, sending configuration information of a predetermined reference signal, where the predetermined reference signal includes at least one of a TRS or a CSI-RS; and a field length of an IE for indicating the configuration information is within a predetermined range

(56) References Cited

OTHER PUBLICATIONS

"Moderator Summary #2 on TRS/CSI-RS occasion(s) for idle/inactive UEs", Moderator (Samsung), 3GPP TSG RAN WG1 #106-e, R1-2108454, 2021, 70 pages.
"Discussion on the configuration of frequency reference in MO", ZTE Corporation, Sanechips, 3GPP TSG-RAN WG2 Meeting #101, R2-1802015, 2018, 14 pages.

* cited by examiner

Terminal

Base station

Step 21, sending configuration information of a predetermined reference signal, where the predetermined reference signal includes at least one of a TRS or a CSI-RS; and a field length of an IE for indicating the configuration information is within a predetermined range

METHOD AND DEVICE FOR SENDING CONFIGURATION INFORMATION, COMMUNICATION DEVICE, AND STORAGE MEDIUM

CROSS-REFERENCE TO RELATED APPLICATIONS

The present disclosure is the U.S. National phase application of International Application No. PCT/CN2022/076116, filed on Feb. 12, 2022, the entire content of which is incorporated herein by reference for all purposes.

TECHNICAL FILED

The present disclosure relates to the field of wireless communication technology, but is not limited thereto, and in particular to a method and device for sending configuration information, a communication device, and a storage medium.

BACKGROUND

When a terminal is in a Radio Resource Control (RRC) idle state, an additional Tracking Reference Signal (TRS) or Channel-State Information Reference Signal (CSI-RS) may be used to assist the terminal in achieving time-frequency domain synchronization with a network. This approach, compared to using a Synchronization Signal Block (SSB) for synchronization with the network, can be more power-efficient. In the related art, it is required to send configuration information for TRS and/or CSI-RS. However, sending this configuration information may lead to a large signaling overhead.

SUMMARY

Embodiments of the present disclosure disclose a method and device for sending configuration information, a communication device, and a storage medium.

According to a first aspect of the embodiments of the present disclosure, a method for sending configuration information is provided, where the method is performed by a base station and includes:

- sending configuration information of a predetermined reference signal;
- where the predetermined reference signal includes at least one of:
- a Tracking Reference Signal (TRS); or
- a Channel-State Information Reference Signal (CSI-RS); and
- a field length of an Information Element (IE) for indicating the configuration information is within a predetermined range.

According to a second aspect of the embodiments of the present disclosure, a method for receiving configuration information is provided, where the method is performed by a terminal and the method includes:

- receiving configuration information of a predetermined reference signal,
- where the predetermined reference signal includes at least one of: a Tracking Reference Signal (TRS); or a Channel-State Information Reference Signal (CSI-RS); and a field length of an Information Element (IE) for indicating the configuration information is within a predetermined range.

According to a third aspect of the embodiments of the present disclosure, a communication device is provided, including:

- a processor;
- a memory for storing instructions executable by the processor;
- where the processor is configured to, when executing the instructions, implement the methods described above.

According to a fourth aspect of the embodiments of the present disclosure, a non-transitory computer storage medium is provided, where the computer storage medium stores a computer executable program which, when executed by a processor, causes the processor to implement the methods described above.

DETAILED DESCRIPTION

Figures 1, 2:
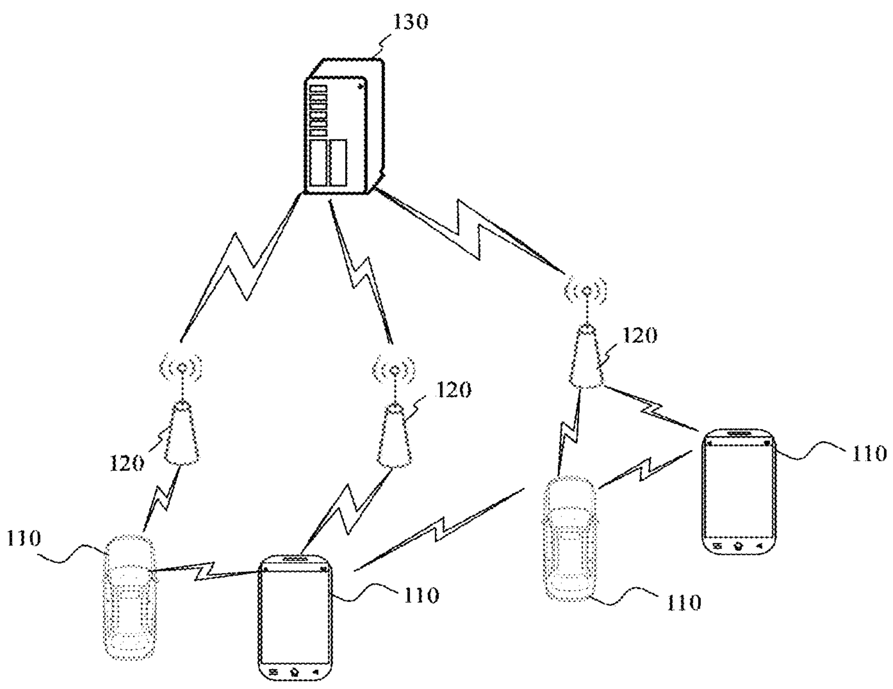
FIG. 1 is a schematic diagram of a structure of a wireless communication system illustrated according to an exemplary embodiment.
FIG. 2 is a flowchart of a method for sending configuration information illustrated according to an exemplary embodiment.

Hereinafter, exemplary embodiments will be described in detail, examples of which are represented in the accompanying drawings. When referring to the drawings, unless otherwise indicated, identical numbers in different drawings denote the same or similar elements. The examples described in the following exemplary embodiments do not represent all examples consistent with the embodiments of the present disclosure. Rather, they are only examples of devices and methods that are consistent with certain aspects of the embodiments of the present disclosure as described in the appended claims.

The terms used in the embodiments of the present disclosure are for the purpose of describing particular embodiments only and are not intended to limit the present disclosure. The singular forms "a," "an," and "the" used in the embodiments and the appended claims of the present disclosure, are intended to include the plural forms as well, unless the context clearly indicates otherwise. It is understood that the terms "and/or" as used herein refer to and encompass any or all possible combinations of one or more of the associated listed items.

It is understood that the terms such as "first," "second," "third," etc., may be used in the embodiments of the present disclosure to describe various information, and the information should not be limited by these terms. These terms are used merely to distinguish one type of information from another. For example, without departing from the scope of the present disclosure, the first information may also be referred to as the second information, and similarly, the second information may also be referred to as the first information. The terms such as "if" may be interpreted as "at the time of," "when" or "in response to determining," depending on the context.

For the purposes of conciseness and ease of understanding, the terms "greater than" or "less than" are used herein to represent size relationships. However, those skilled in the art will understand that the term "greater than" also encompasses the meaning of "greater than or equal to," and the term "less than" also encompasses the meaning of "less than or equal to."

Please refer to FIG. 1, which illustrates a schematic diagram of a structure of a wireless communication system provided in accordance with an exemplary embodiment of the present disclosure. As shown in FIG. 1, the wireless communication system is a communication system based on mobile communication technology, which may include several user devices 110 and several base stations 120.

The user device 110 may refer to a device that provides voice and/or data connectivity to users. The user device 110 can communicate with one or more core networks via a Radio Access Network (RAN). The user device 110 may be an Internet of Things (IOT) user device, such as a sensor device, a mobile phone, and a computer with an IoT user device, which may be a fixed, portable, pocket-sized, handheld, computer-integrated, or vehicular device. For example, it may be a station (STA), subscriber unit, subscriber station, mobile station, mobile terminal, remote station, access point, remote terminal, access terminal, user terminal, user agent, user device, or user equipment. Alternatively, the user device 110 may be a device for unmanned aerial vehicles. Alternatively, the user device 110 may be a vehicular device, such as an in-vehicle computer with wireless communication capabilities, or a wireless user device connected to an external in-vehicle computer. Alternatively, the user device 110 may be a roadside device, such as a streetlight with wireless communication capabilities, a traffic light, or other roadside devices.

The base station 120 may be a network-side device in the wireless communication system. The wireless communication system may be a 4th Generation Mobile Communication (4G) system, also known as Long Term Evolution (LTE) system. Alternatively, the wireless communication system may be a 5G system, also known as New Radio (NR) system or 5G NR system. Alternatively, the wireless communication system may be a next-generation system of the 5G system. In the 5G system, the access network can be referred to as New Generation-Radio Access Network (NG-RAN).

The base station 120 may be an evolved NodeB (eNB) used in the 4G system. Alternatively, the base station 120 may be a gNB using a centralized and distributed architecture in the 5G system. When the base station 120 adopts the centralized and distributed architecture, it typically includes a central unit (CU) and at least two distributed units (DU). The central unit hosts protocol stacks such as Packet Data Convergence Protocol (PDCP) layer, Radio Link Control (RLC) layer, and Media Access Control (MAC) layer. The distributed unit hosts the Physical (PHY) layer protocol stack. Specific implementations of the base station 120 are not limited in the embodiments of the present disclosure.

Wireless connections can be established between the base station 120 and the user device 110 via a wireless air interface. In different embodiments, this wireless air interface may be based on a 4G standard or 5G standards, for example, this wireless air interface is a New Radio (NR) interface. Alternatively, this wireless air interface may be based on the wireless technology standard of the next generation mobile communication network after 5G.

In some embodiments, end-to-end (E2E) connections can also be established between user devices 110, for example, in the scenarios of vehicle-to-everything (V2X) communications, such as vehicle-to-vehicle (V2V), vehicle-to-infrastructure (V2I), and vehicle-to-pedestrian (V2P) communications.

Here, the aforementioned user device may serve as the terminal device in the following embodiments.

In some embodiments, the wireless communication system mentioned above may also include a network management device 130.

Several base stations 120 are connected to the network management device 130, respectively. The network management device 130 may be a core network device in the wireless communication system. For example, the network management device 130 may be a Mobility Management Entity (MME) in an Evolved Packet Core (EPC) network. Alternatively, the network management device may be other core network device, such as a Serving Gate Way (SGW), Public Data Network GateWay (PGW), Policy and Charging Rules Function (PCRF), or Home Subscriber Server (HSS). Specific implementations of the network management device 130 are not limited in the embodiments of the present disclosure.

To facilitate understanding for those skilled in the art, multiple examples are described in the embodiments of the present disclosure to clearly illustrate the technical solutions of the present disclosure. However, those skilled in the art will understand that the examples provided in the embodiments of the present disclosure can be individually executed, combined with methods from other embodiments of the present disclosure, or executed independently or in combination with methods from other related technologies, which is not limited in the embodiments of the present disclosure.

To better understand the technical solutions described in any embodiment of the present disclosure, first, application scenarios in the related art are explained as follows.

In one embodiment, configuration information of an additional TRS and/or CSI-RS, and status information on whether it is being broadcast or not, is broadcast in system messages. The configuration information of the TRS and/or CSI-RS can be indicated separately from the available status information. That is, the network may have configured the TRS and/or CSI-RS but has not actually transmitted them, i.e., has not provided the configuration information for the terminal in the RRC idle state. In one embodiment, this method is determined by the implementation of the base station. In one embodiment, the configuration information of the TRS and/or CSI-RS can be set in a System Information Block (SIB).

In one embodiment, please refer to Table 1, which illustrates the number of bits required for the TRS configuration.

TABLE 1

| Parameter | Number of bits to be occupied |
|---|---|
| TRS-ResourceSetId | 6 |
| frequencyDomainAllocation | 2 |
| numofslot | 1 |
| startingRB | 9= |
| nrofRBs | 9 |
| periodicityAndOffset | 13 => 3 |
| firstOFDMSymbolInTimeDomain | 4 |
| powerControlOffsetSS | 2 |
| ssb-index | 6 |
| indBitID | 3 |
| scramblingID | 10 bits (if per TRS resource set); 10*4 = 40 bits (if per TRS resource) |
| Size in total | 65 bits (if scramblingID is per TRS resource set); 95 bits (if scramblingID is per TRS resource) |

In one embodiment, if each TRS resource set is 65 bits or 95 bits, the total number of bits is: 65*64=4160 bits or 95*64=6080 bits. In this case, it exceeds the total number of bits that an SIB block can accommodate (approximately 2800 bits), thus requiring segmentation of the SIB.

In one embodiment, if the segmentation can be avoided, it is required to consider how to reduce the signaling overhead. Refer to Table 1, where the largest occupying fields include a startingRB, which denotes a starting resource block. However, since the TRS is only used for the terminal in the RRC idle state, its bandwidth will not exceed the size of a control resource set (e.g., Coreset0), i.e., 96 physical resource blocks (PRBs), and therefore 7 bits are sufficient for the startingRB.

As shown in FIG. 2, this embodiment provides a method for sending configuration information, where the method is performed by a base station and includes the following step.

Step 21, sending configuration information of a predetermined reference signal.

The predetermined reference signal includes at least one of the following: a Tracking Reference Signal (TRS), or a Channel-State Information Reference Signal (CSI-RS). A field length of an Information Element (IE) for indicating the configuration information is within a predetermined range.

The base station involved in the present disclosure may be an access device for a terminal to access a network. Here, the base station can be of various types, such as a base station in a 3$^{rd}$ Generation Mobile Communication (3G) network, a base station in a 4th Generation Mobile Communication (4G) network, a base station in a 5th Generation Mobile Communication (5G) network, or other evolved base stations.

The terminal involved in the present disclosure may be, but is not limited to, a mobile phone, wearable device, vehicle-mounted terminal, Road Side Unit (RSU), smart home terminal, industrial sensor device, and/or medical device.

Here, the IE is used to indicate the configuration information. A field or data field of each IE may correspond to an information domain, where a field length of the IE corresponds to the number of bits occupied by the information domain. It is noted that the field length can be determined based on the number of bits occupied by the information domain. For example, if the number of bits occupied by the information domain corresponding to the field is 6 bits, the field length can be 6. It will be understood that there may be one or more IEs, and accordingly, the field, in the TRS configuration and/or CSI-RS, may be at least one of the following: startingRB, nrofRBs, periodicityAndOffset, TRS-ResourceSetId, or scramblingID, without limitation herein.

Exemplarily, the configuration information of the predetermined reference signal is sent, where the predetermined reference signal includes at least one of a TRS or a CSI-RS; and a field length of the IE for indicating a starting resource block (startingRB) and/or the number of resource blocks (nrofRBs) of the configuration information is within a predetermined range.

In one embodiment, the configuration information of the predetermined reference signal can be sent via a system message, where the predetermined reference signal includes at least one of a TRS, or a CSI-RS; and a field length of the IE for indicating the configuration information is within a predetermined range. It is noted that this configuration information can be carried by a System Information Block (SIB).

In one embodiment, the predetermined range can be determined based on a signaling overhead requirement parameter. For example, in response to the signaling overhead requirement parameter being greater than a parameter threshold, the predetermined range can be determined to be greater than the threshold range; or in response to the signaling overhead requirement parameter being less than a parameter threshold, the predetermined range can be determined to be less than the threshold range. Thus, the predetermined range can adapt to signaling overhead requirement parameters.

In one embodiment, the field length of the IE for indicating the configuration information can be determined based on network configuration information.

In one embodiment, the field length of the IE for indicating the configuration information is determined based on a field length indicated by the network configuration information. For example, if the network configuration information indicates a field length of 7 bits, the field length of the IE for indicating the configuration information can be determined to be 7 bits. Here, the field length indicated by the network configuration information is within the predetermined range. That is, the field length is directly indicated by the network configuration information.

In one embodiment, the field length of the IE for indicating the configuration information is determined based on a field length of a predetermined IE indicated by the network configuration information. That is, the field length of the IE for indicating the configuration information is determined based on the field length of a specific IE indicated by the network configuration information.

In one embodiment, the field length of the IE for indicating the configuration information can be determined based on a field length of a predetermined IE indicated by the network configuration information of a control resource set (Coreset). Here, the control resource set can be Coreset0.

For example, if the network configuration information indicates a numerical range from 1 to a or 0 to a−1, requiring b bits, the field length of the IE for indicating the configuration information can be determined to be b bits based on this network configuration information. Alternatively, if the network configuration information indicates a bandwidth for Coreset0 that includes a RBs, it can be determined, based on the bandwidth of Coreset0, that a numerical range indicated is from 1 to a or 0 to a−1, requiring b bits. According to this network configuration information, the field length of the IE for indicating the configuration information can be determined to be b bits.

Exemplarily, when a frequency range is a first frequency range FR1 and a Subcarrier Spacing (SCS) is 15 kHz, the bandwidth of Coreset0 can be configured to include 24 RBs, 48 RBs, or 96 RBs.

Exemplarily, if the network configuration information indicates a numerical range from 1 to 96 or 0 to 95, requiring 7 bits, it can be determined, based on this network configuration information, that the field length of the IE for indicating the configuration information is 7 bits. Alternatively, if the network configuration information indicates a bandwidth for Coreset0 that includes 96 RBs, it can be determined, based on the bandwidth of Coreset0, that a numerical range indicated is from 1 to 96 or 0 to 95, requiring 7 bits. According to this network configuration information, the field length of the IE for indicating the configuration information can be determined to be 7 bits.

Exemplarily, if the network configuration information indicates a numerical range from 1 to 48 or 0 to 47, requiring 6 bits, it can be determined, based on this network configuration information, that the field length of the IE for indicating the configuration information is 6 bits. Alternatively, if the network configuration information indicates a bandwidth for Coreset0 that includes 48 RBs, it can be determined, based on the bandwidth of Coreset0, that a numerical range indicated is from 1 to 48 or 0 to 47, requiring 6 bits. According to this network configuration information, the field length of the IE for indicating the configuration information can be determined to be 6 bits.

Exemplarily, if the network configuration information indicates a numerical range of 24, requiring 5 bits, it can be determined, based on this network configuration information, that the field length of the IE for indicating the configuration information is 5 bits. Alternatively, if the network configuration information indicates a bandwidth for Coreset0 that includes 24 RBs, it can be determined, based on the bandwidth of Coreset0, that a numerical range indicated is from 1 to 24 or 0 to 23, requiring 5 bits. According to this network configuration information, the field length of the IE for indicating the configuration information can be determined to be 5 bits. In one embodiment, the IE includes an IE indicating startingRB and/or nrofRBs, and the length of the field indicating a startingRB and/or indicating the nrofRBs is determined based on the network configuration information. For example, a numerical value configured for the startingRB in the network configuration information is 6, and the numerical value configured for the nrofRBs is 7. In this example, the field length corresponding to the startingRB is 6, and the field length corresponding to the nrofRBs is 7.

It will be understood that the IE indicating configuration information described above may be the IE indicating the startingRB, or the IE indicating the nrofRBs, or the IE indicating the startingRB and the nrofRBs, which is merely an example, and other types of IEs are also possible, and the present disclosure is not limited thereto.

In one embodiment, the IE includes an IE indicating the nrofRBs. The field length for indicating the nrofRBs is determined based on the minimum number of RBs occupied by the predetermined reference signal indicated by the network configuration information, and/or the number of RBs included in a bandwidth of a predetermined control resource set indicated by the network configuration information.

Exemplarily, the minimum number of RBs occupied by TRS is 24. When a frequency range is a first frequency range FR1 and a Subcarrier Spacing (SCS) is 15 kHz, the bandwidth of Coreset0 can be configured to include 24 RBs, 48 RBs, or 96 RBs.

Exemplarily, if the network configuration information indicates a bandwidth for Coreset0 that includes 96 RBs, it can be determined, based on the bandwidth of Coreset0, that the numerical range indicated is from 24 to 96, requiring 7 bits. According to this network configuration information, the field length for indicating the nrofRBs can be determined to be 7 bits.

Exemplarily, if the network configuration information indicates a bandwidth for Coreset0 that includes 48 RBs, it can be determined, based on the bandwidth of Coreset0, that the numerical range indicated is from 24 to 48, requiring 5 bits. According to this network configuration information, the field length for indicating the nrofRBs can be determined to be 5 bits.

Exemplarily, if the network configuration information indicates a bandwidth for Coreset0 that includes 24 RBs, it can be determined, based on the bandwidth of Coreset0, that the numerical range indicated can only be 24, requiring 1 bit. Alternatively, the IE indicating the nrofRBs can be omitted (or indicated implicitly). According to this network configuration information, the field length for indicating the nrofRBs can be determined to be 0 or 1 bit.

In one embodiment, the IE includes an IE indicating the startingRB. The field length for indicating the startingRB is determined based on the minimum number of RBs occupied by the predetermined reference signal indicated by the network configuration information, and/or the number of RBs included in a bandwidth of a predetermined control resource set indicated by the network configuration information.

For example, the minimum number of RBs occupied by TRS is 24. When a frequency range is a first frequency range FR1 and a Subcarrier Spacing (SCS) is 15 kHz, the bandwidth of Coreset0 can be configured to include 24 RBs, 48 RBs, or 96 RBs.

Exemplarily, if the network configuration information indicates a bandwidth for Coreset0 that includes 96 RBs, it can be determined, based on the bandwidth of Coreset0, that the numerical range indicated is from 1 to 73, requiring 7 bits. According to this network configuration information, the field length for indicating the startingRB can be determined to be 7 bits.

Exemplarily, if the network configuration information indicates a bandwidth for Coreset0 that includes 48 RBs, it can be determined, based on the bandwidth of Coreset0, that the numerical range indicated is from 1 to 25, requiring 5 bits. According to this network configuration information, the field length for indicating the startingRB can be determined to be 5 bits.

Exemplarily, if the network configuration information indicates a bandwidth for Coreset0 that includes 24 RBs, it can be determined, based on the bandwidth of Coreset0, that the numerical value indicated is 1, requiring 1 bit. Alternatively, the IE indicating the startingRB can be omitted (or indicated implicitly). According to this network configuration information, the field length for indicating the startingRB can be determined to be 0 or 1 bit.

In one embodiment, the field length of the IE for indicating the configuration information is determined based on a predetermined protocol.

In one embodiment, when it is determined, based on the predetermined protocol, that a frequency range is a first frequency range FR1 and a Subcarrier Spacing (SCS) is 15 kHz, the field length for indicating the startingRB and/or indicating the nrofRBs is a first value. For example, the first value is 7.

In one embodiment, when it is determined, based on the predetermined protocol, that a frequency range is a first frequency range FR1 and a Subcarrier Spacing (SCS) is 15 kHz, the field length for indicating the nrofRBs is a second value. For example, the second value is 7.

In one embodiment, when it is determined, based on the predetermined protocol, that a frequency range is a first frequency range FR1 and a Subcarrier Spacing (SCS) is 15 kHz, the field length for indicating the startingRB is a third value. For example, the third value is 7.

In one embodiment, the IE includes an IE indicating periodicity and offset (periodicityAndOffset). The field length for indicating the periodicityAndOffset is determined based on the number of candidate sets indicated by predetermined configuration information.

In one embodiment, the total number of candidate sets indicated by the periodicityAndOffset can be pre-configured. For example, if the predetermined configuration information indicates that the total number of candidate sets indicated by the periodicityAndOffset, which is pre-configured, is 8, it is only required 3 bits for indicating the candidate sets, and in this case, the field length for indicating the periodicityAndOffset can be determined to be 3. For example, if the predetermined configuration information indicates that the total number of candidate sets indicated by the periodicityAndOffset, which is pre-configured, is 16, it is only required 4 bits for indicating the candidate sets, and in this case, the field length for indicating the periodicityAndOffset can be determined to be 4.

In one embodiment, 8 values can be configured to indicate the candidate sets, which are periodicityAndOffset0 to periodicityAndOffset7, respectively. A value of periodicity and offset can be provided for each one selected from 8 subcarrier spacings.

In one embodiment, different IEs for indicating the configuration information are jointly encoded. Exemplarily, the IEs include an IE indicating the startingRB and an IE indicating the nrofRBs, in which case the startingRB and the nrofRBs can be jointly encoded to reduce the field length. In one embodiment, a joint encoding result can indicate an index of a starting RB for TRS and the number of continuous RBs occupied by TRS starting from this starting index. For example, the first RB of Coreset0 is used as a reference position (i.e., the position of RB0) to determine the index of this starting RB.

In one embodiment, the joint encoding method is an encoding method of Resource Indication Value (RIV).

In one embodiment, the number of continuous RBs occupied by TRS is less than the number of RBs included in the bandwidth of the predetermined control resource set. For example, the number of continuous RBs occupied by TRS is less than the number of RBs included in the bandwidth of the predetermined control resource set (e.g., Coreset0).

In one embodiment, when a frequency range is a first frequency range FR1 and a Subcarrier Spacing (SCS) is 15 kHz, the bandwidth for Coreset0 can be configured to include 24 RBs, 48 RBs, or 96 RBs. If the network-configured bandwidth of Coreset 0 includes 96 RBs, a joint encoding information field for the startingRB and the nrofRBs needs to occupy 13 bits. If the network-configured bandwidth of Coreset 0 includes 48 RBs, a joint encoding information field for the startingRB and the nrofRBs needs to occupy 11 bits. If the network-configured bandwidth of Coreset 0 includes 24 RBs, a joint encoding information field for the startingRB and the nrofRBs needs to occupy 9 bits.

In one embodiment, the field length of the IE indicating a joint encoding result of the startingRB and the nrofRBs is determined to be a fourth value based on the predetermined protocol.

For example, according to the predetermined protocol, when it is determined that a frequency range is a first frequency range FR1 and a Subcarrier Spacing (SCS) is 15 kHz, the field length of the IE indicating the joint encoding result of the startingRB and the nrofRBs is 13.

In one embodiment, the number of continuous RBs occupied by TRS is greater than the predetermined number of RBs and less than the number of RBs included in the bandwidth of the predetermined control resource set.

Exemplarily, the number of continuous RBs occupied by TRS is not less than the minimum number of RBs and not more than the number of RBs of Coreset0.

In one embodiment, the minimum number of RBs occupied by TRS is 24. When a frequency range is a first frequency range FR1 and the subcarrier spacing (SCS) is 15 kHz, the bandwidth for Coreset0 can be configured to include 24 RBs, 48 RBs, or 96 RBs. If the network-configured bandwidth of Coreset0 includes 96 RBs, a joint encoding information field for the startingRB and the nrofRBs needs to occupy 12 bits. If the network-configured bandwidth of Coreset0 includes 48 RBs, a joint encoding information field for the startingRB and the nrofRBs needs to occupy 9 bits. If the network-configured bandwidth of Coreset 0 includes 24 RBs, a joint encoding information field for the startingRB and the nrofRBs needs to occupy 0 or 1 bit.

In one embodiment, the field length of the IE indicating a joint encoding result of the startingRB and the nrofRBs is determined to be a fifth value based on the predetermined protocol.

In one embodiment, according to the predetermined protocol, when it is determined that a frequency range is a first frequency range FR1 and a Subcarrier Spacing (SCS) is 15 kHz, the field length of the IE indicating the joint encoding result of the startingRB and the nrofRBs is 12.

In the embodiments of the present disclosure, the configuration information of the predetermined reference signal is sent, where the predetermined reference signal includes at least one of a TRS or a CSI-RS; and the field length of the IE used for indicating the configuration information is within a predetermined range. In this way, the field length of the IE for indicating the configuration information is within a predetermined range, which, compared to the case where the field length of the IE for sending the configuration information is not restricted, results in the IE's field length being shorter, and thus, fewer signaling resources are consumed when sending configuration information, thereby reducing the signaling overhead.

Those skilled in the art will understand that the method provided in this embodiment of this disclosure can be performed independently or in conjunction with some methods in other embodiments of this disclosure or in the related art.

Figure 3:
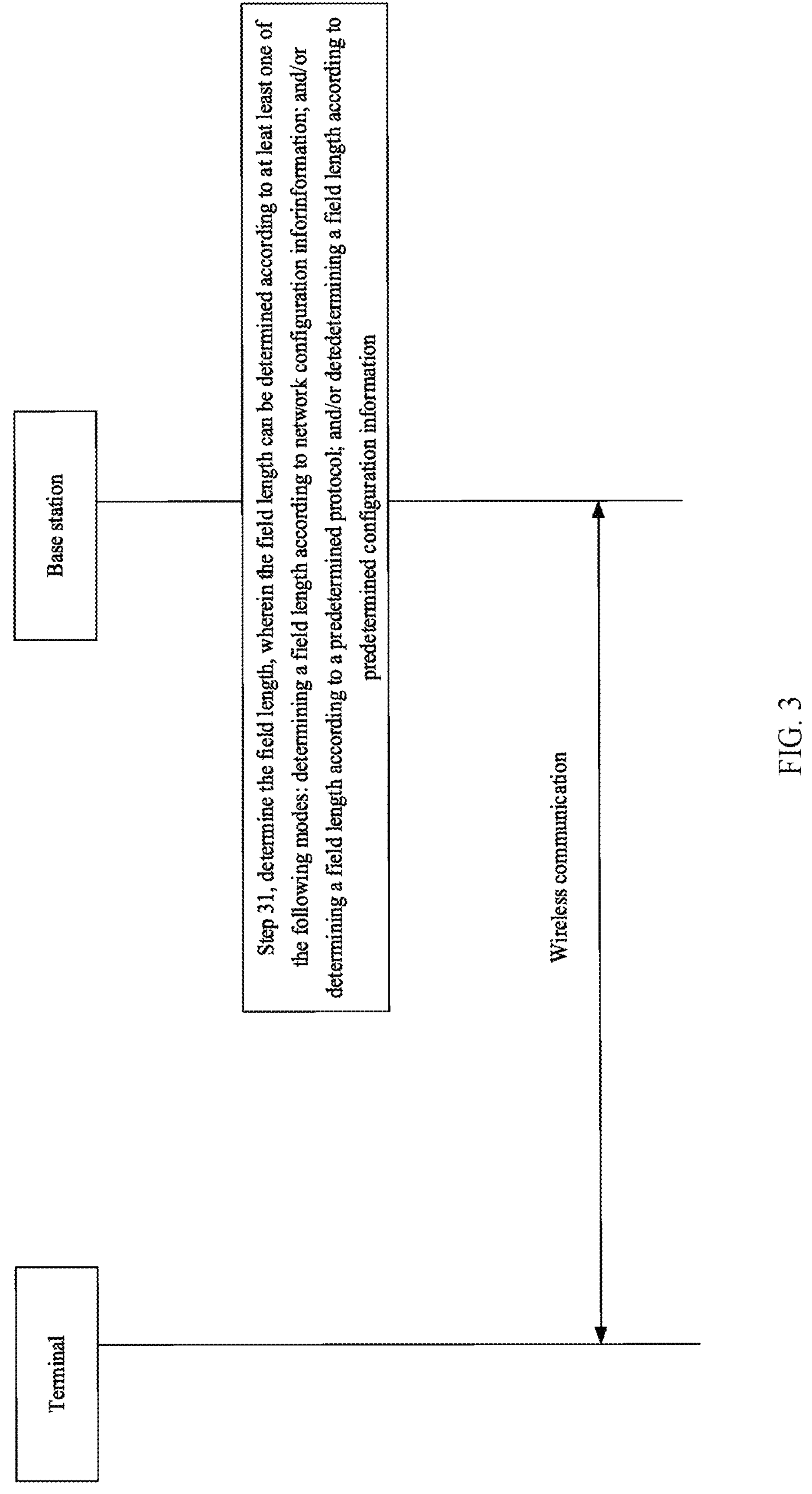
FIG. 3 is a flowchart of a method for sending configuration information illustrated according to an exemplary embodiment.

As shown in FIG. 3, this embodiment provides a method for sending configuration information, where the method is performed by a base station and includes the following step.

Step 31, determining the field length, where the field length can be determined based on at least one of the following methods: determining the field length based on network configuration information; determining the field length based on a predetermined protocol; or determining the field length based on predetermined configuration information.

In one embodiment, the field length of the IE for the configuration information of the predetermined reference signal is determined based on the network configuration information, and the configuration information of the predetermined reference signal is sent, where the predetermined reference signal includes at least one of the following: a Tracking Reference Signal (TRS), or a Channel-State Information Reference Signal (CSI-RS); and the field length of the IE used to indicate the configuration information is within a predetermined range.

In one embodiment, the field length of the IE for the configuration information of the predetermined reference signal is determined based on the predetermined protocol, and the configuration information of the predetermined reference signal is sent, where the predetermined reference signal includes at least one of the following: a Tracking Reference Signal (TRS), or a Channel-State Information Reference Signal (CSI-RS); and the field length of the IE used to indicate the configuration information is within a predetermined range.

In one embodiment, the field length of the IE for the configuration information of the predetermined reference signal is determined based on the predetermined configuration information, and the configuration information of the predetermined reference signal is sent, where the predetermined reference signal includes at least one of the following: a Tracking Reference Signal (TRS), or a Channel-State Information Reference Signal (CSI-RS); and the field length of the IE used to indicate the configuration information is within a predetermined range.

Those skilled in the art will understand that the method provided in this embodiment of this disclosure can be performed independently or in conjunction with some methods in other embodiments of this disclosure or in the related art.

Figure 4:
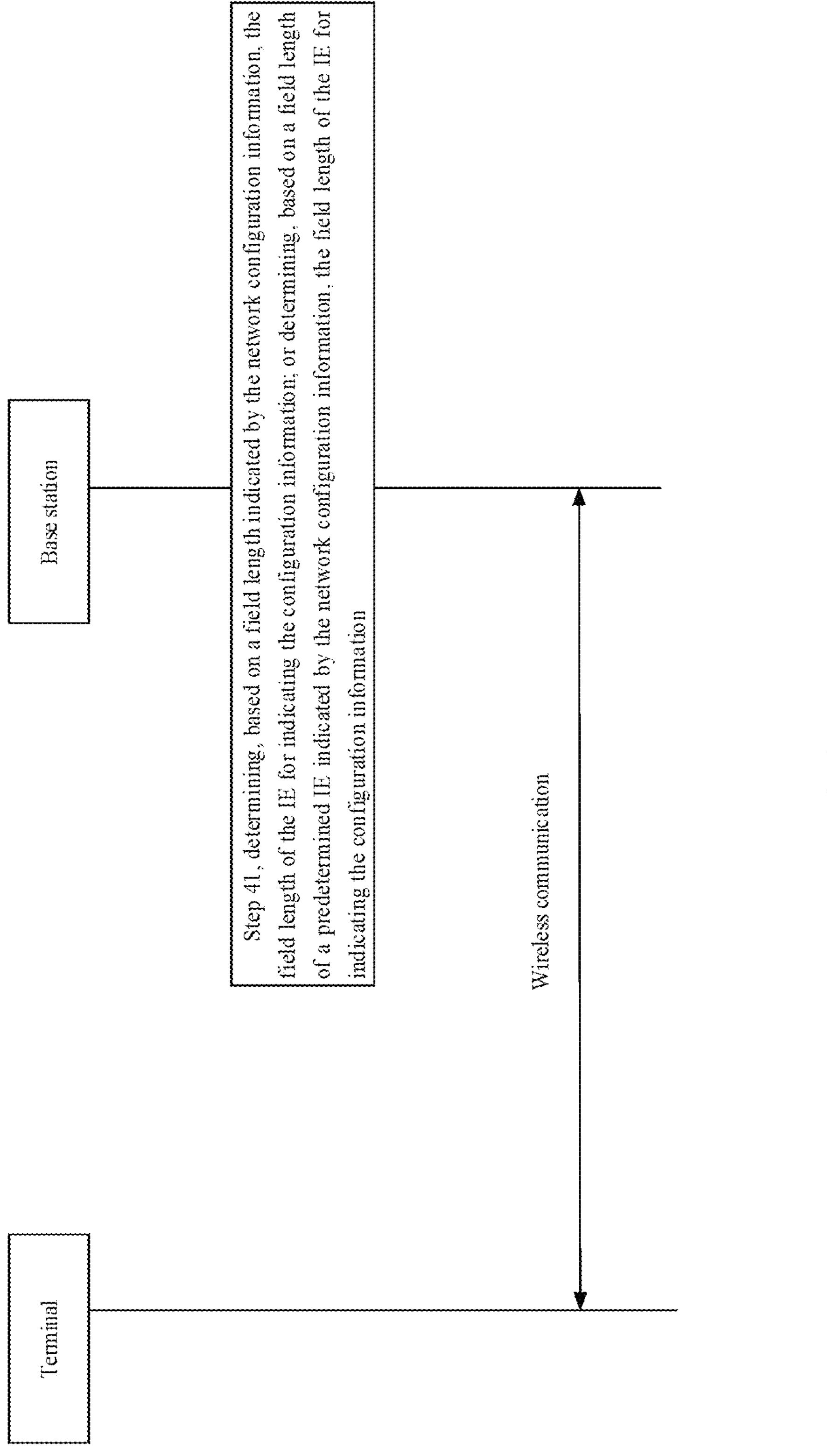
FIG. 4 is a flowchart of a method for sending configuration information illustrated according to an exemplary embodiment.

As shown in FIG. 4, this embodiment provides a method for sending configuration information, where the method is performed by a base station and includes the following steps.

Step 41, determining, based on a field length indicated by the network configuration information, the field length of the IE for indicating the configuration information; or determining, based on a field length of a predetermined IE indicated by the network configuration information, the field length of the IE for indicating the configuration information.

In one embodiment, the field length of the IE for indicating the configuration information is determined based on the field length indicated by the network configuration information, and the configuration information of the predetermined reference signal is sent, where the predetermined reference signal includes at least one of the following: a Tracking Reference Signal (TRS), or a Channel-State Information Reference Signal (CSI-RS); and the field length of the IE for indicating the configuration information is within a predetermined range.

In another embodiment, the field length of the IE for indicating the configuration information is determined based on the field length of the predetermined IE indicated by the network configuration information, and the configuration information of the predetermined reference signal is sent, where the predetermined reference signal includes at least one of the following: a Tracking Reference Signal (TRS), or a Channel-State Information Reference Signal (CSI-RS); and the field length of the IE for indicating the configuration information is within a predetermined range.

In one embodiment, when the field length indicated by the network configuration information is X bits, it can be determined that the field length of the IE for indicating the configuration information is X bits. Here, the field length indicated by the network configuration information is within the predetermined range.

In one embodiment, when the field length of the predetermined IE indicated by the network configuration information is Y bits, it is determined that the field length of the IE for indicating the configuration information is Y bits.

In one embodiment, the field length of the IE for indicating the configuration information can be determined based on the field length of the predetermined IE indicated by the network configuration information of the control resource set (Coreset). Here, the control resource set can be Coreset0.

Those skilled in the art will understand that the method provided in this embodiment of this disclosure can be performed independently or in conjunction with some methods in other embodiments of this disclosure or in the related art.

Figure 5:
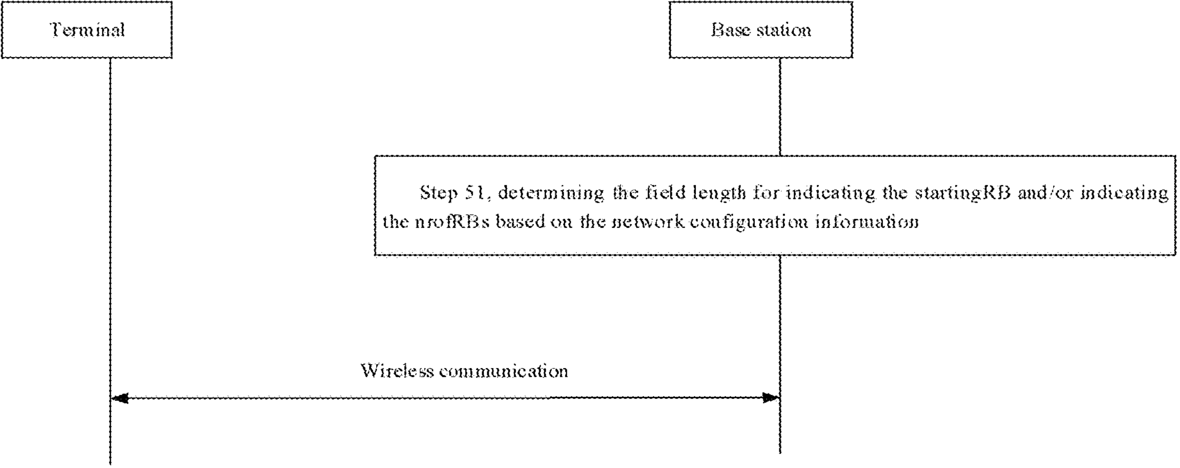
FIG. 5 is a flowchart of a method for sending configuration information illustrated according to an exemplary embodiment.

As shown in FIG. 5, this embodiment provides a method for sending configuration information, where the method is performed by a base station and the IE includes an IE indicating a starting resource block (startingRB) and/or indicating a number of resource blocks (nrofRBs). The method includes the following step.

Step 51, determining the field length for indicating the startingRB and/or indicating the nrofRBs based on the network configuration information.

In one embodiment, the field length for indicating the startingRB and/or indicating the nrofRBs is determined based on the network configuration information; and the configuration information of the predetermined reference signal is sent, where the predetermined reference signal includes at least one of the following: a Tracking Reference Signal (TRS), or a Channel-State Information Reference Signal (CSI-RS); and the field length of the IE for indicating the configuration information is within a predetermined range.

In one embodiment, when a value configured in the network configuration information specific for the startingRB is a and a value configured in the network configuration information specific for the nrofRBs is b, the field length corresponding to the startingRB is a, and the field length corresponding to the nrofRBs is b.

Those skilled in the art will understand that the method provided in this embodiment of this disclosure can be performed independently or in conjunction with some methods in other embodiments of this disclosure or in the related art.

Figure 6:
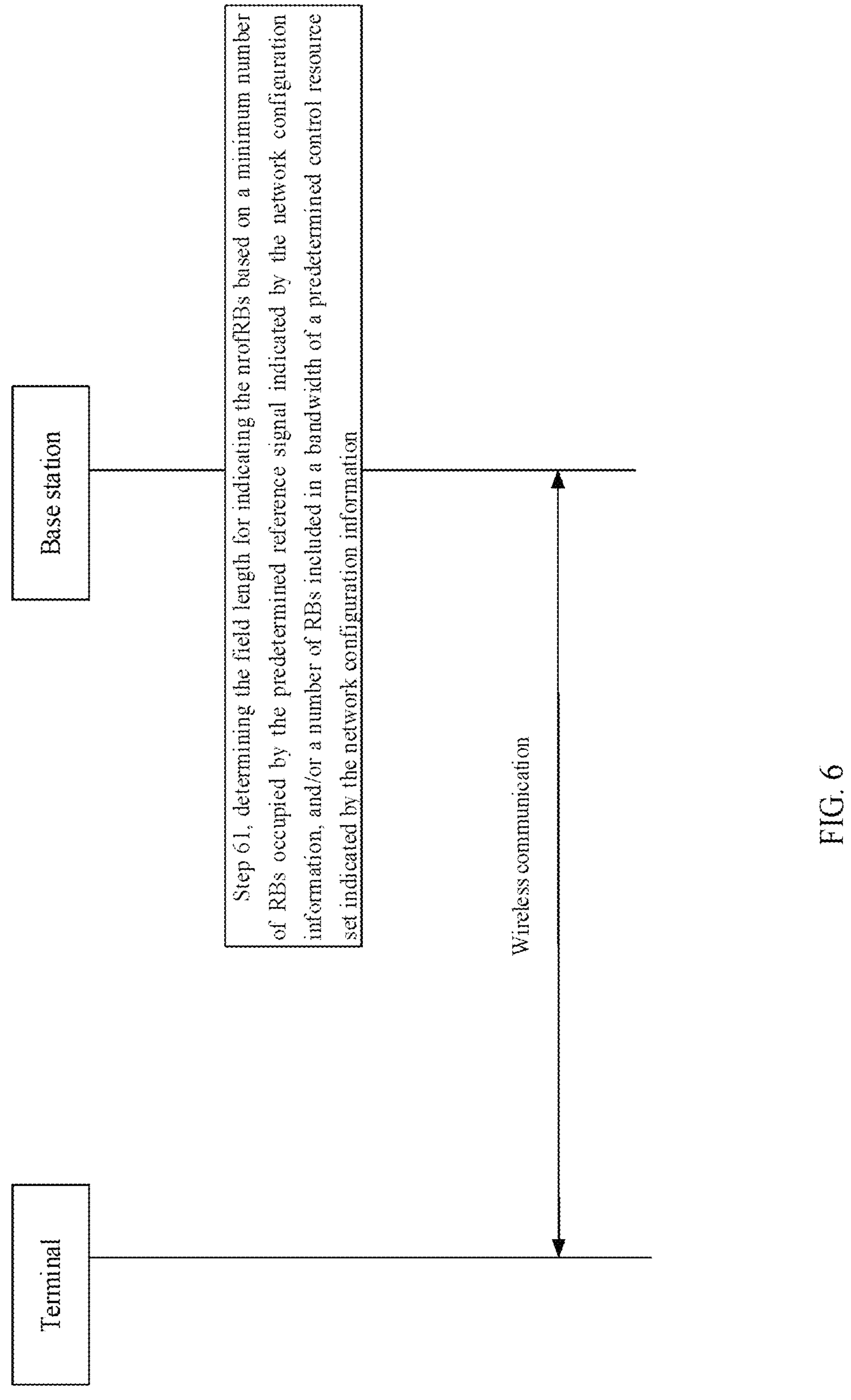
FIG. 6 is a flowchart of a method for sending configuration information illustrated according to an exemplary embodiment.

As shown in FIG. 6, this embodiment provides a method for sending configuration information, where the method is performed by a base station and the IE includes an IE indicating the nrofRBs. The method includes the following step.

Step 61, determining the field length for indicating the nrofRBs based on a minimum number of RBs occupied by the predetermined reference signal indicated by the network configuration information, and/or a number of RBs included in a bandwidth of a predetermined control resource set indicated by the network configuration information.

In one embodiment, the field length for indicating the nrofRBs is determined based on a minimum number of RBs occupied by the predetermined reference signal indicated by the network configuration information, and/or a number of RBs included in a bandwidth of a predetermined control resource set indicated by the network configuration information; and the configuration information of the predetermined reference signal is sent, where the predetermined reference signal includes at least one of the following: a Tracking Reference Signal (TRS), or a Channel-State Information Reference Signal (CSI-RS); and the field length of the IE for indicating the configuration information is within a predetermined range.

Exemplarily, the minimum number of RBs occupied by TRS is 24. When a frequency range is a first frequency range FR1 and a Subcarrier Spacing (SCS) is 15 KHz, the bandwidth for Coreset0 can be configured to include 24 RBs, 48 RBs, or 96 RBs. Exemplarily, if the bandwidth of Coreset0 indicated by the network configuration information includes 96 RBs, it can be determined, based on the bandwidth of Coreset0, that a numerical range indicated is from 24 to 96, requiring 7 bits. According to this network configuration information, the field length for indicating the norfRBs can be determined to be 7 bits.

Those skilled in the art will understand that the method provided in this embodiment of this disclosure can be performed independently or in conjunction with some methods in other embodiments of this disclosure or in the related art.

Figure 7:
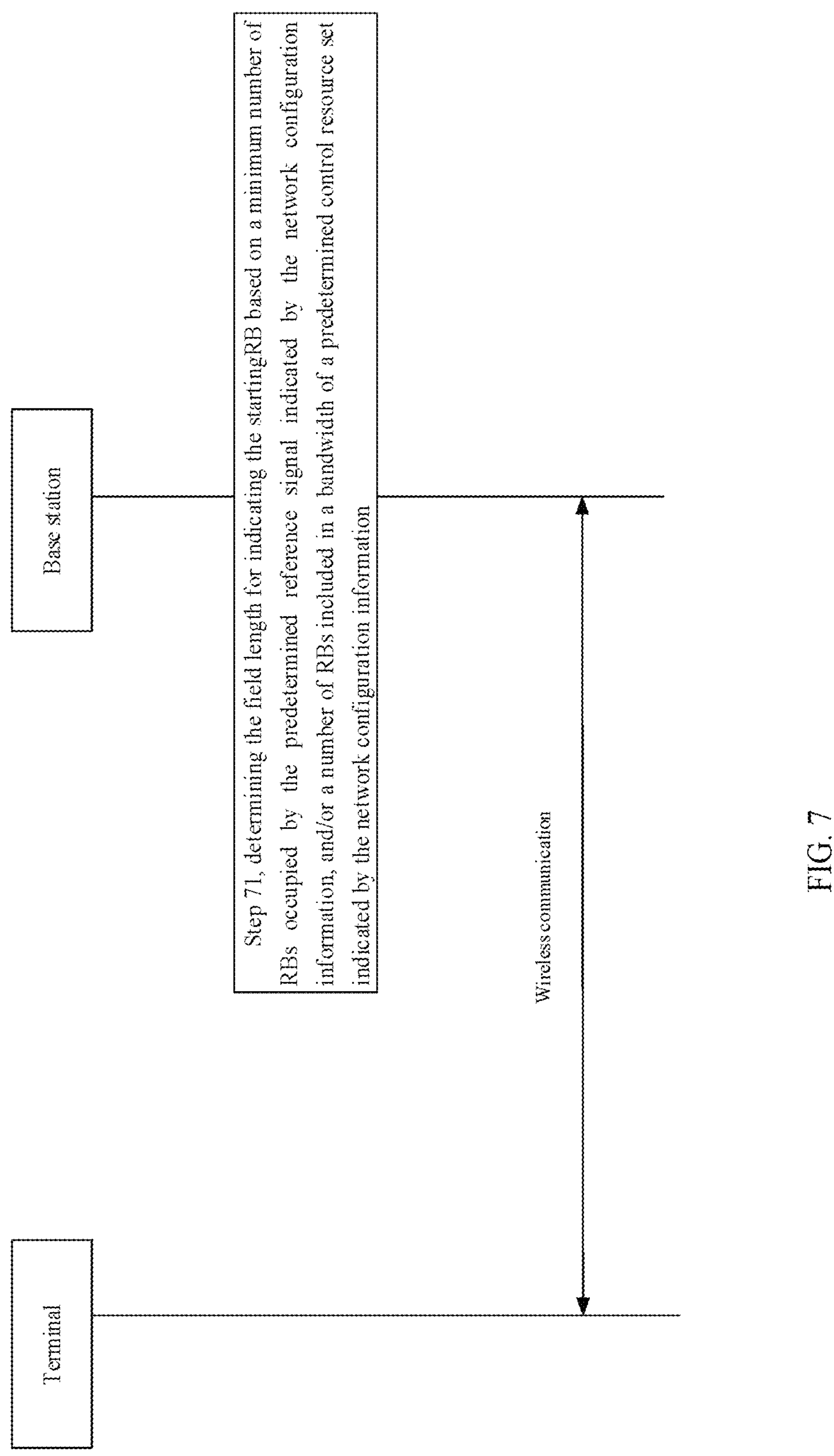
FIG. 7 is a flowchart of a method for sending configuration information illustrated according to an exemplary embodiment.

As shown in FIG. 7, this embodiment provides a method for sending configuration information, where the method is performed by a base station and the IE includes an IE indicating the startingRB. The method includes the following step.

Step 71, determining the field length for indicating the startingRB based on a minimum number of RBs occupied by the predetermined reference signal indicated by the network configuration information, and/or a number of RBs included in a bandwidth of a predetermined control resource set indicated by the network configuration information.

In one embodiment, the field length for indicating the startingRB is determined based on a minimum number of RBs occupied by the predetermined reference signal indicated by the network configuration information, and/or a number of RBs included in a bandwidth of a predetermined control resource set indicated by the network configuration information; and the configuration information of the predetermined reference signal is sent, where the predetermined reference signal includes at least one of the following: a Tracking Reference Signal (TRS), or a Channel-State Information Reference Signal (CSI-RS); and the field length of the IE for indicating the configuration information is within a predetermined range.

Exemplarily, the minimum number of RBs occupied by TRS is 24. When a frequency range is a first frequency range FR1 and a Subcarrier Spacing (SCS) is 15 KHz, the bandwidth for Coreset0 can be configured to include 24 RBs, 48 RBs, or 96 RBs. Exemplarily, if the bandwidth of Coreset0 indicated by the network configuration information includes 96 RBs, it can be determined, based on the bandwidth of Coreset0, that a numerical range indicated is from 1 to 73, requiring 7 bits. According to this network configuration information, the field length for indicating the startingRB can be determined to be 7 bits.

Those skilled in the art will understand that the method provided in this embodiment of this disclosure can be performed independently or in conjunction with some methods in other embodiments of this disclosure or in the related art.

Figure 8:
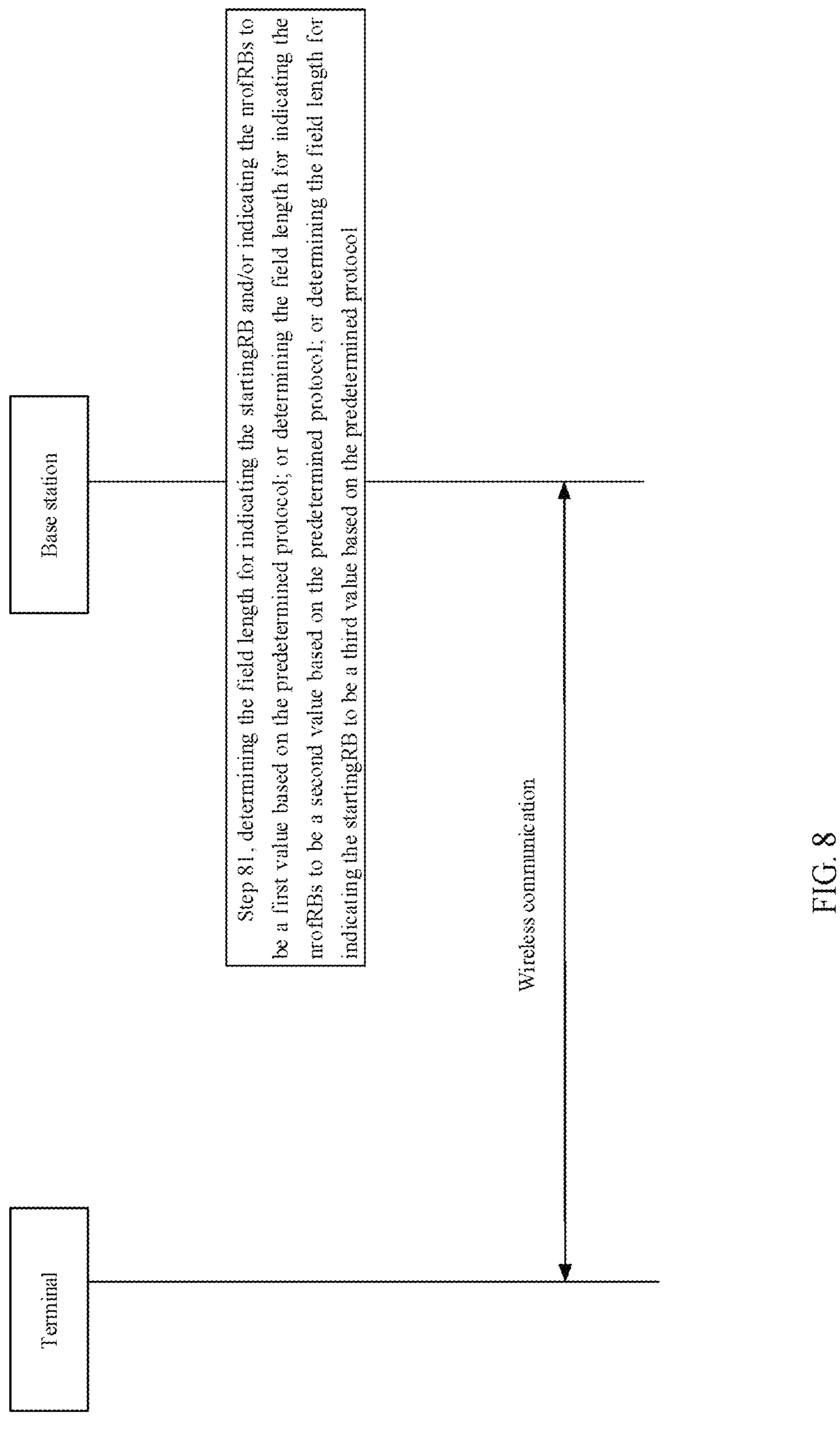
FIG. 8 is a flowchart of a method for sending configuration information illustrated according to an exemplary embodiment.

As shown in FIG. 8, this embodiment provides a method for sending configuration information, where the method is performed by a base station and the IE includes an IE indicating the startingRB and/or norfRBs. The method includes the following step.

Step 81, determining the field length for indicating the startingRB and/or indicating the nrofRBs to be a first value based on the predetermined protocol; or determining the field length for indicating the nrofRBs to be a second value based on the predetermined protocol; or determining the field length for indicating the startingRB to be a third value based on the predetermined protocol.

In one embodiment, when it is determined, based on the predetermined protocol, that a frequency range is a first frequency range FR1 and a Subcarrier Spacing (SCS) is 15 kHz, the field length for indicating the startingRB and/or the nrofRBs is a first value. For example, the first value is 7. The configuration information of the predetermined reference signal is sent, where the predetermined reference signal includes at least one of the following: a Tracking Reference Signal (TRS), or a Channel-State Information Reference Signal (CSI-RS); and the field length of the IE for indicating the configuration information is within a predetermined range.

In one embodiment, when it is determined, based on the predetermined protocol, that a frequency range is a first frequency range FR1 and a Subcarrier Spacing (SCS) is 15 kHz, the field length for indicating the nrofRBs is a second value. For example, the second value is 7. The configuration information of the predetermined reference signal is sent, where the predetermined reference signal includes at least one of the following: a Tracking Reference Signal (TRS), or a Channel-State Information Reference Signal (CSI-RS); and the field length of the IE for indicating the configuration information is within a predetermined range.

In one embodiment, when it is determined, based on the predetermined protocol, that a frequency range is a first frequency range FR1 and a Subcarrier Spacing (SCS) is 15 kHz, the field length for indicating the startingRB is a third value. For example, the third value is 7. The configuration information of the predetermined reference signal is sent, where the predetermined reference signal includes at least one of the following: a Tracking Reference Signal (TRS), or a Channel-State Information Reference Signal (CSI-RS); and the field length of the IE for indicating the configuration information is within a predetermined range.

Those skilled in the art will understand that the method provided in this embodiment of this disclosure can be performed independently or in conjunction with some methods in other embodiments of this disclosure or in the related art.

Figure 9:
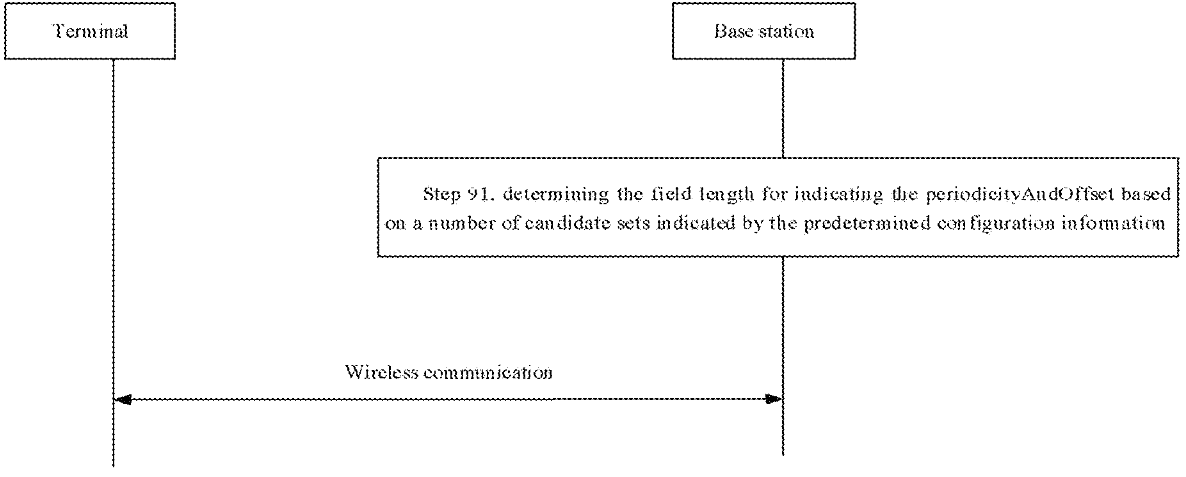
FIG. 9 is a flowchart of a method for sending configuration information illustrated according to an exemplary embodiment.

As shown in FIG. 9, this embodiment of the present disclosure provides a method for sending configuration information, where the method is performed by a base station and the IE includes an IE indicating periodicity and offset (periodicityAndOffset). The method includes the following step.

Step 91, determining the field length for indicating the periodicityAndOffset based on a number of candidate sets indicated by the predetermined configuration information.

In one embodiment, the field length for indicating the periodicityAndOffset is determined based on the number of candidate sets indicated by the predetermined configuration information; and the configuration information of the predetermined reference signal is sent, where the predetermined reference signal includes at least one of the following: a Tracking Reference Signal (TRS), or a Channel-State Information Reference Signal (CSI-RS); and the field length of the IE for indicating the configuration information is within a predetermined range.

In one embodiment, the total number of candidate sets indicated by the periodicityAndOffset can be pre-configured. Exemplarily, if the predetermined configuration information indicates that the total number of candidate sets indicated by the periodicityAndOffset, which is pre-configured, is 8, it is only required 3 bits for indicating the candidate sets, and in this case, the field length for indicating the periodicityAndOffset can be determined to be 3. Exemplarily, if the predetermined configuration information indicates that the total number of candidate sets indicated by the periodicityAndOffset, which is pre-configured, is 16, it is only required 4 bits for indicating the candidate sets, and in this case, the field length for indicating the periodicityAndOffset can be determined to be 4.

Those skilled in the art will understand that the method provided in this embodiment of this disclosure can be performed independently or in conjunction with some methods in other embodiments of this disclosure or in the related art.

Figure 10:
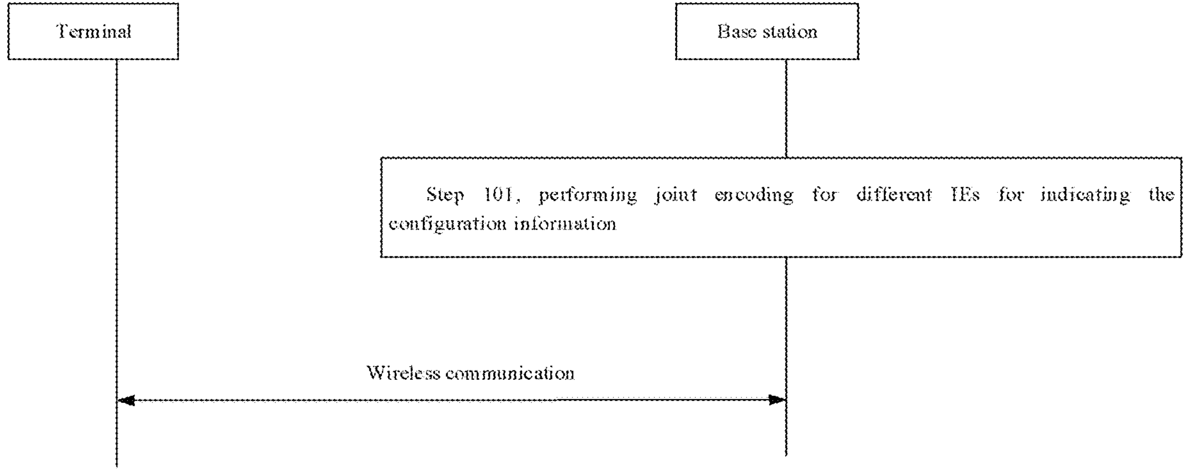
FIG. 10 is a flowchart of a method for sending configuration information illustrated according to an exemplary embodiment.

As shown in FIG. 10, this embodiment of the present disclosure provides a method for sending configuration information, where the method is performed by a base station and includes the following step.

Step 101, performing joint encoding of different IEs for indicating the configuration information.

Exemplarily, the IEs include an IE indicating a starting resource block (startingRB) and an IE indicating a number of resource blocks (nrofRBs), in which case the startingRB and the nrofRBs can be jointly encoded to reduce the field length. In one embodiment, a joint encoding result can indicate an index of a starting RB for TRS and the number of continuous RBs occupied by TRS starting from this starting index. Exemplarily, the first RB of Coreset0 is used as a reference position (i.e., the position of RB0) to determine the index of this starting RB.

In one embodiment, the joint encoding method is an encoding method of Resource Indication Value (RIV).

Those skilled in the art will understand that the method provided in this embodiment of this disclosure can be performed independently or in conjunction with some methods in other embodiments of this disclosure or in the related art.

In one embodiment, different IEs for indicating the configuration information are jointly encoded, where the number of continuous RBs occupied by TRS is less than the number of RBs included in the bandwidth of the predetermined control-resource set.

Exemplarily, the number of continuous RBs occupied by TRS is less than the number of RBs included in the bandwidth of the predetermined control resource set (e.g., Coreset0).

Figure 11:
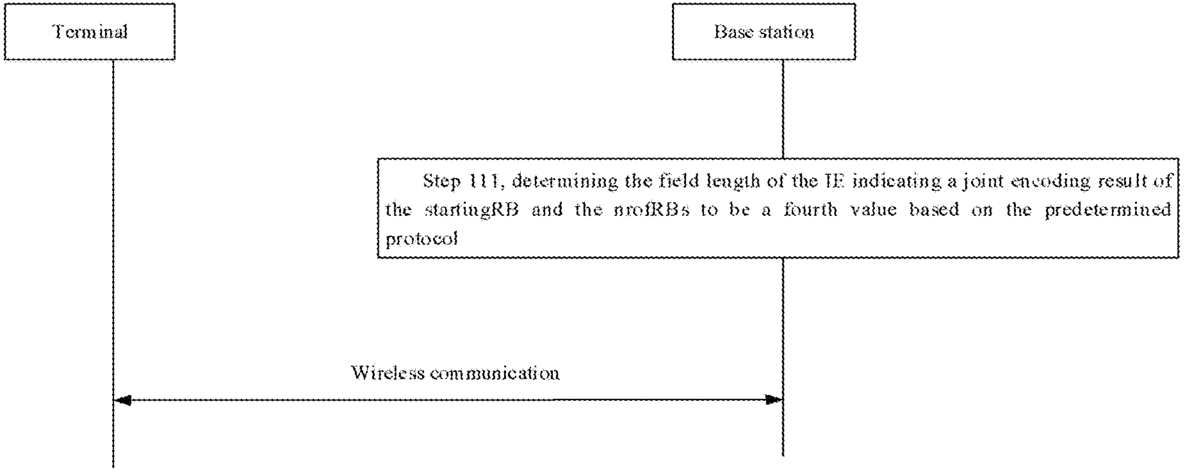
FIG. 11 is a flowchart of a method for sending configuration information illustrated according to an exemplary embodiment.

As shown in FIG. 11, this embodiment of the present disclosure provides a method for sending configuration information, where the method is performed by a base station and includes the following step.

Step 111, determining the field length of the IE indicating a joint encoding result of the startingRB and the nrofRBs to be a fourth value based on the predetermined protocol.

In one embodiment, according to the predetermined protocol, when it is determined that a frequency range is a first frequency range FR1 and a Subcarrier Spacing (SCS) is 15 kHz, the field length of the IE indicating the joint encoding result of the startingRB and the nrofRBs is a fourth value. For example, the fourth value is 13. The configuration information of the predetermined reference signal is sent, where the predetermined reference signal includes at least one of the following: a Tracking Reference Signal (TRS), or a Channel-State Information Reference Signal (CSI-RS); and the field length of the IE for indicating the configuration information is within a predetermined range.

In one embodiment, when a frequency range is a first frequency range FR1 and a Subcarrier Spacing (SCS) is 15 KHz, the bandwidth for Coreset0 can be configured to include 24 RBs, 48 RBs, or 96 RBs. If the network-configured bandwidth of Coreset0 includes 96 RBs, the joint encoding information field for the startingRB and the nrofRBs needs to occupy 13 bits. If the network-configured bandwidth of Coreset0 includes 48 RBs, the joint encoding information field for the startingRB and the nrofRBs needs to occupy 11 bits. If the network-configured bandwidth of Coreset0 includes 24 RBs, the joint encoding information field for the startingRB and the nrofRBs needs to occupy 9 bits. Exemplarily, according to the predetermined protocol, the field length of the IE indicating the joint encoding result of the startingRB and the nrofRBs is determined to be 13.

Those skilled in the art will understand that the method provided in this embodiment of this disclosure can be performed independently or in conjunction with some methods in other embodiments of this disclosure or in the related art.

In one embodiment, the number of continuous RBs occupied by TRS is greater than the predetermined number of RBs and less than the number of RBs included in the predetermined Control Resource Set.

Exemplarily, the number of continuous RBs occupied by TRS is not less than the minimum number of RBs and does not exceed the number of RBs in Coreset0.

Figure 12:
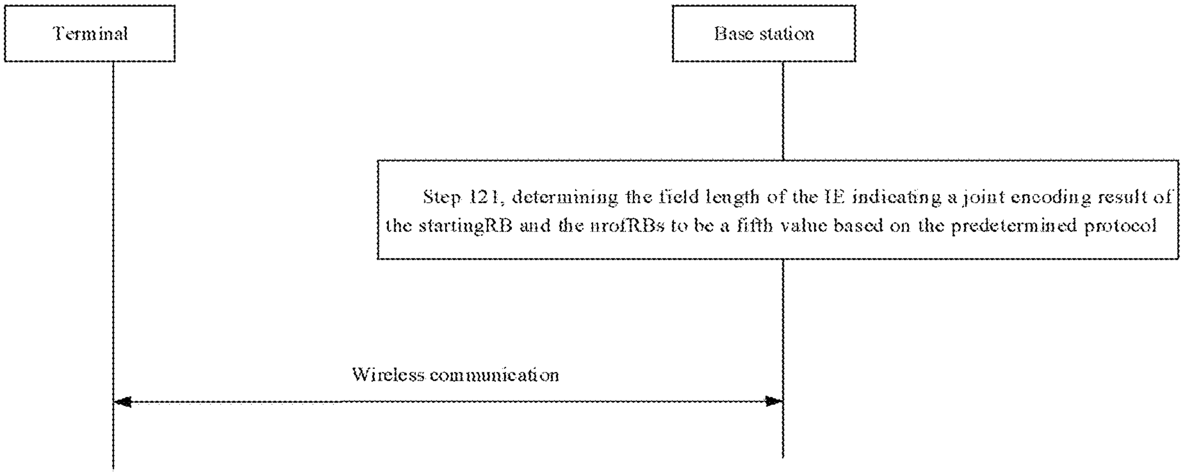
FIG. 12 is a flowchart of a method for sending configuration information illustrated according to an exemplary embodiment.

As shown in FIG. 12, this embodiment of the present disclosure provides a method for sending configuration information. The method is performed by a base station and includes the following step.

Step 121, determining the field length of the IE indicating a joint encoding result of the startingRB and the nrofRBs to be a fifth value based on the predetermined protocol.

In one embodiment, according to the predetermined protocol, when it is determined that a frequency range is a first frequency range FR1 and a Subcarrier Spacing (SCS) is 15 kHz, the field length of the IE indicating the joint encoding result of the startingRB and the nrofRBs is a fifth value. For example, the fifth value is 12. The configuration information of the predetermined reference signal is sent, where the predetermined reference signal includes at least one of the following: a Tracking Reference Signal (TRS), or a Channel-State Information Reference Signal (CSI-RS); and the field length of the IE for indicating the configuration information is within a predetermined range.

In one embodiment, the minimum number of RBs occupied by TRS is 24. When a frequency range is a first frequency range FR1 and a Subcarrier Spacing (SCS) is 15 KHz, the bandwidth for Coreset0 can be configured to include 24 RBs, 48 RBs, or 96 RBs. If the network-configured bandwidth of Coreset0 includes 96 RBs, the joint encoding information field for the startingRB and the nrofRBs needs to occupy 12 bits. If the network-configured bandwidth of Coreset0 includes 48 RBs, the joint encoding information field for the startingRB and the nrofRBs needs to occupy 9 bits. If the network-configured bandwidth of Coreset0 includes 24 RBs, the joint encoding information field for the startingRB and the nrofRBs needs to occupy 0 or 1 bit. In one embodiment, according to the predetermined protocol, the field length of the IE indicating the joint encoding result of the startingRB and the nrofRBs is determined to be 12.

Those skilled in the art will understand that the method provided in this embodiment of this disclosure can be performed independently or in conjunction with some methods in other embodiments of this disclosure or in the related art.

Figure 13:
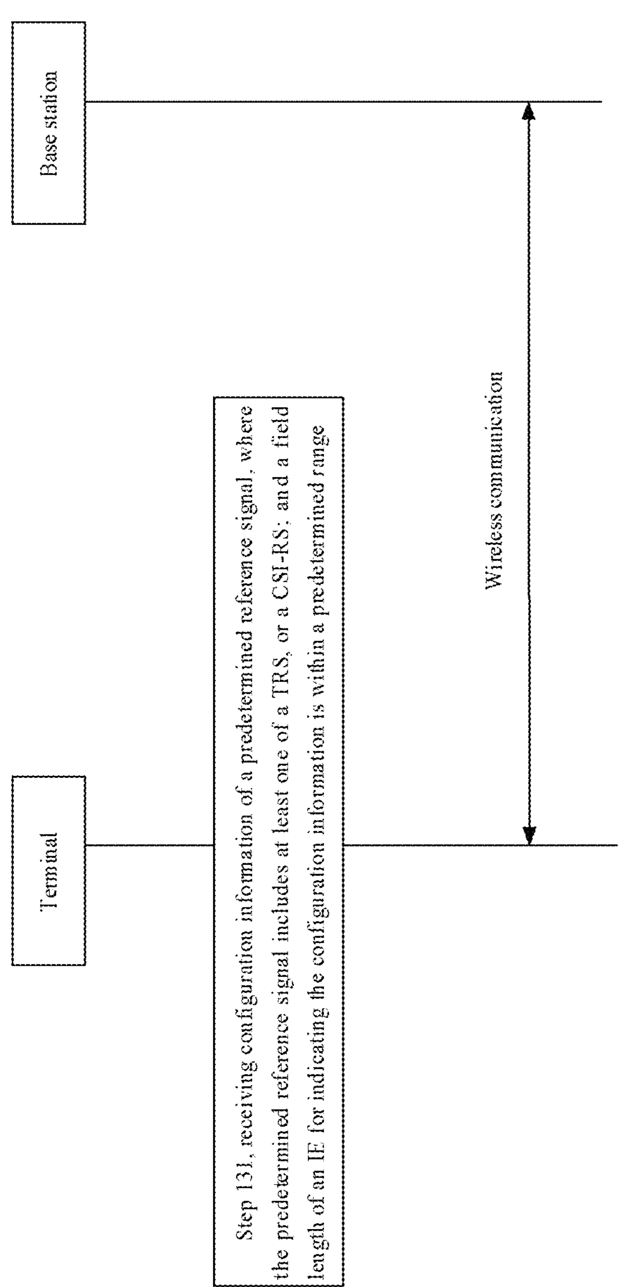
FIG. 13 is a flowchart of a method for receiving configuration information illustrated according to an exemplary embodiment.

As shown in FIG. 13, this embodiment of the present disclosure provides a method for receiving configuration information. The method is performed by a terminal and includes the following step.

Step 131, receiving configuration information of a predetermined reference signal.

The predetermined reference signal includes at least one of the following: a Tracking Reference Signal (TRS), or a Channel-State Information Reference Signal (CSI-RS). A field length of an Information Element (IE) for indicating the configuration information is within a predetermined range.

The base station involved in the present disclosure may be an access device for a terminal to access a network. Here, the base station can be of various types, such as a base station in a 3$^{rd}$ Generation Mobile Communication (3G) network, a base station in a 4th Generation Mobile Communication (4G) network, a base station in a 5th Generation Mobile Communication (5G) network, or other evolved base stations.

The terminal involved in the present disclosure may be, but is not limited to, a mobile phone, wearable device, vehicle-mounted terminal, Road Side Unit (RSU), smart home terminal, industrial sensor device, and/or medical device.

Here, the IE is used to indicate the configuration information. A field of each IE can correspond to an information domain, where a field length of the IE corresponds to the number of bits occupied by the information domain. It is noted that the field length can be determined based on the number of bits occupied by the information domain. For example, if the number of bits occupied by the information domain corresponding to the field is 6 bits, the field length can be 6. It will be understood that there may be one or more IEs, and accordingly, the field, in the TRS configuration and/or CSI-RS, can be at least one of the following: startingRB, nrofRBs, periodicityAndOffset, or TRS-ResourceSetId, scramblingID, without limitation herein.

Exemplarily, the configuration information of the predetermined reference signal is received, where the predetermined reference signal includes at least one of the following: a Tracking Reference Signal (TRS), or a Channel-State Information Reference Signal (CSI-RS); and a field length of the IE for indicating a starting resource block (startingRB) and/or the number of resource blocks (nrofRBs) of the configuration information is within a predetermined range.

In one embodiment, the configuration information of the predetermined reference signal can be received via a system message, where the predetermined reference signal includes at least one of the following: a Tracking Reference Signal (TRS), or a Channel-State Information Reference Signal (CSI-RS); and a field length of the IE for indicating the configuration information is within a predetermined range. It is noted that this configuration information can be carried by a System Information Block (SIB).

In one embodiment, the predetermined range can be determined based on a signaling overhead requirement parameter. For example, in response to the signaling overhead requirement parameter being greater than a parameter threshold, the predetermined range can be determined to be greater than the threshold range; or in response to the signaling overhead requirement parameter being less than a parameter threshold, the predetermined range can be determined to be less than the threshold range. Thus, the predetermined range can adapt to signaling overhead requirement parameters.

It is noted that the description in this embodiment can specifically refer to the description in the embodiment of Step 21, which is not repeated here.

Those skilled in the art will understand that the method provided in this embodiment of this disclosure can be performed independently or in conjunction with some methods in other embodiments of this disclosure or in the related art.

Figure 14:
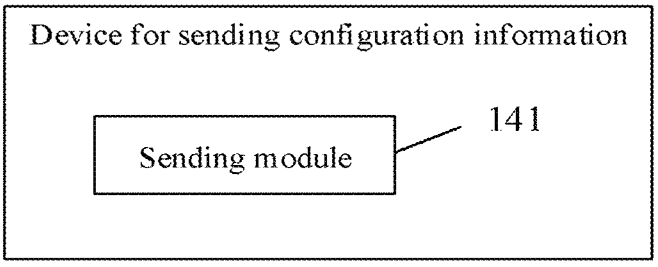
FIG. 14 is a schematic diagram of a structure of a device for sending configuration information illustrated according to an exemplary embodiment.

As shown in FIG. 14, an embodiment of the present disclosure provides a device for sending configuration information, where the device includes:

a sending module 141 configured to send configuration information of a predetermined reference signal;

where the predetermined reference signal includes at least one of: a Tracking Reference Signal (TRS); or a Channel-State Information Reference Signal (CSI-RS); and a field length of an Information Element (IE) for indicating the configuration information is within a predetermined range.

Those skilled in the art will understand that the method provided in this embodiment of this disclosure can be performed independently or in conjunction with some methods in other embodiments of this disclosure or in the related art.

Figure 15:
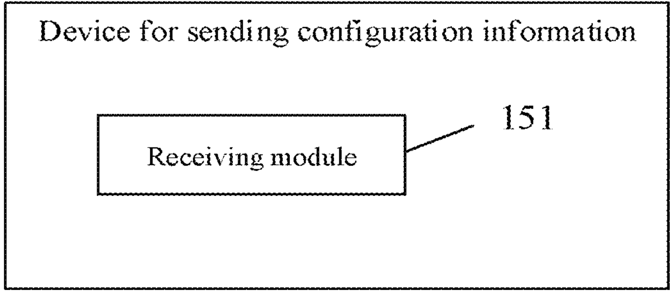
FIG. 15 is a schematic diagram of a structure of a device for receiving configuration information illustrated according to an exemplary embodiment.

As shown in FIG. 15, an embodiment of the present disclosure provides a device for sending configuration information, where the device includes:

a receiving module 151 configured to receive configuration information of a predetermined reference signal;

where the predetermined reference signal includes at least one of: a Tracking Reference Signal (TRS); or a Channel-State Information Reference Signal (CSI-RS); and a field length of an Information Element (IE) for indicating the configuration information is within a predetermined range.

Those skilled in the art will understand that the method provided in this embodiment of this disclosure can be performed independently or in conjunction with some methods in other embodiments of this disclosure or in the related art.

An embodiment of the present disclosure provides a communication device, the communication device including:

a processor;

a memory for storing instructions executable by the processor;

where the processor is configured to, when executing the instructions, implement the method applied to any embodiment of the present disclosure.

The processor may include various types of storage medium, which is a non-transitory computer storage medium that can continue to memorize the information stored thereon after the communication device is powered down.

The processor may be connected to the memory via a bus or similar means for reading executable programs stored in the memory.

An embodiment of the present disclosure also provides a computer storage medium, where the computer storage medium stores a computer-executable program that, when executed by a processor, causes the processor to implement the method of any embodiment of the present disclosure.

Regarding the device in the embodiments described above, specific ways in which each module performs operations have been detailed in embodiments related to the method and are not repeated here.

Figure 16:
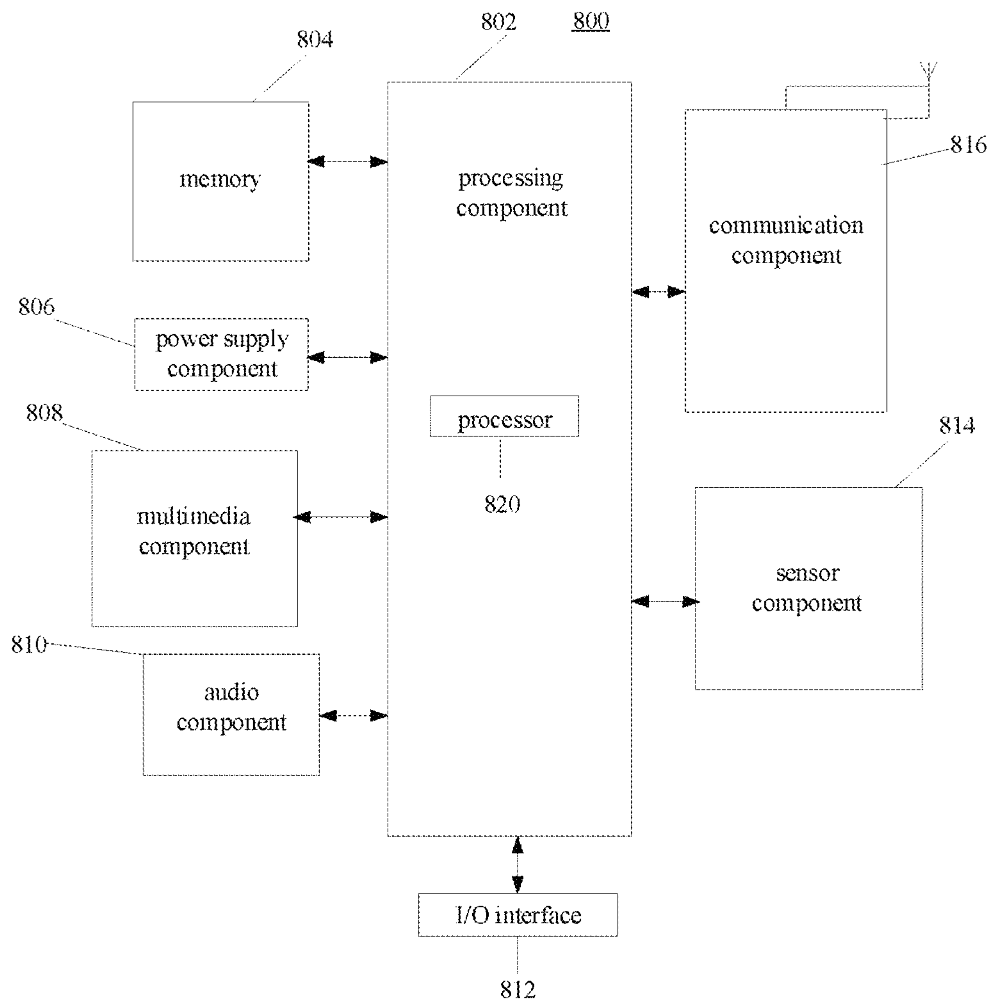
FIG. 16 is a schematic diagram of a structure of a terminal illustrated according to an exemplary embodiment.

As shown in FIG. 16, an embodiment of the present disclosure provides a structure of a terminal.

Referring to a terminal 800 shown in FIG. 16, this embodiment provides a specific example of the terminal 800, which may specifically be a mobile phone, computer, digital broadcast terminal, message receiver/transmitter, game console, tablet device, medical device, fitness equipment, personal digital assistant, and the like.

Referring to FIG. 16, the terminal 800 may include one or more of the following components: a processing component 802, a memory 804, a power supply component 806, a multimedia component 808, an audio component 810, an input/output (I/O) interface 812, a sensor component 814, and a communication component 816.

The processing component 802 generally controls the overall operation of the terminal 800, such as operations associated with display, telephone calls, data communication, camera operations, and recording operations. The processing component 802 may include one or more processors 820 to execute instructions to complete all or part of the steps of the above methods. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations on the device 800. Examples of such data include instructions for any application programs or methods operated on the terminal 800. For example, it may be contact data, phonebook data, messages, pictures, videos, etc. The memory 804 can be implemented by any type of volatile or non-volatile storage device or the combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, disk or optical disc.

The power supply component 806 provides power to various components of the terminal 800. The power supply component 806 may include a power management system, one or more power sources, and other components associated with generating, managing, and distributing power for the terminal 800.

The multimedia component 808 includes a screen that provides an output interface between the terminal 800 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, slide, and gestures on the touch panel. The touch sensor can detect not only the boundaries of touch or slide actions but also detect the duration and pressure associated with touch or slide operations. In some embodiments, the multimedia component 808 includes a front camera and/or a rear camera. When the device 800 is in operation mode, such as shooting mode or video mode, the front camera and/or rear camera can receive external multimedia data. Each front camera/rear camera may be a fixed optical lens system or have focal length and optical zoom capabilities.

The audio component 810 is configured to output and/or input audio signals. For example, the audio component 810 includes a microphone (MIC). When the terminal 800 is in operation mode, such as call mode, recording mode, and voice recognition mode, microphone is configured to receive external audio signals. The received audio signal can be further stored in the memory 804 or transmitted via the communication component 816. In some embodiments, the audio component 810 further includes a speaker for outputting audio signals.

The I/O interface 812 provides an interface between the processing component 802 and peripheral interface modules. The peripheral interface modules may include keyboards, click wheels, buttons, and the like. These buttons may include, but are not limited to: home button, volume button, start button, and lock button.

The sensor component 814 includes one or more sensors to provide status assessment of various aspects of the terminal 800. For example, the sensor component 814 can detect the open/close state of the device 800, the relative positioning of components, such as the display and keypad of the terminal 800. The sensor component 814 can also detect changes in position of the terminal 800 or a component thereof, the presence or absence of user contact with the terminal 800, orientation of the terminal 800, acceleration/deceleration of the terminal 800, and temperature changes of the terminal 800. The sensor component 814 may include a proximity sensor configured to detect the presence of nearby objects without any physical contact. The sensor component 814 may also include light sensors, such as CMOS or CCD image sensors, for use in imaging applications. In some embodiments, the sensor component 814 further includes an accelerometer, gyroscope sensor, magnetic sensor, pressure sensor, or temperature sensor.

The communication component 816 is configured to facilitate wired or wireless communication between the terminal 800 and other devices. The terminal 800 can access wireless networks based on communication standards, such as Wi-Fi, 2G or 3G, or their combination. In an exemplary embodiment, the communication component 816 receives broadcast signals or broadcast-related information from an external broadcast management system via a broadcast channel. In an exemplary embodiment, the communication component 816 further includes a Near Field Communication (NFC) module to facilitate short-range communication. For example, the NFC module can be implemented based on radio frequency identification (RFID) technology, Infrared Data Association (IrDA) technology, Ultra-Wideband (UWB) technology, Bluetooth® (BT) technology, and other technologies.

In some exemplary embodiments, the terminal 800 may be implemented by one or more application-specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components to execute the methods described above.

In some exemplary embodiments, there is provided a non-transitory computer-readable storage medium including instructions, such as the memory 804 including the instructions. The instructions can be executed by the processor 820 of the terminal 800 to implement the methods described above. For example, the non-transitory computer-readable storage medium may include ROM, random access memory (RAM), CD-ROM, tape, floppy disk, optical data storage device, etc.

Figure 17:
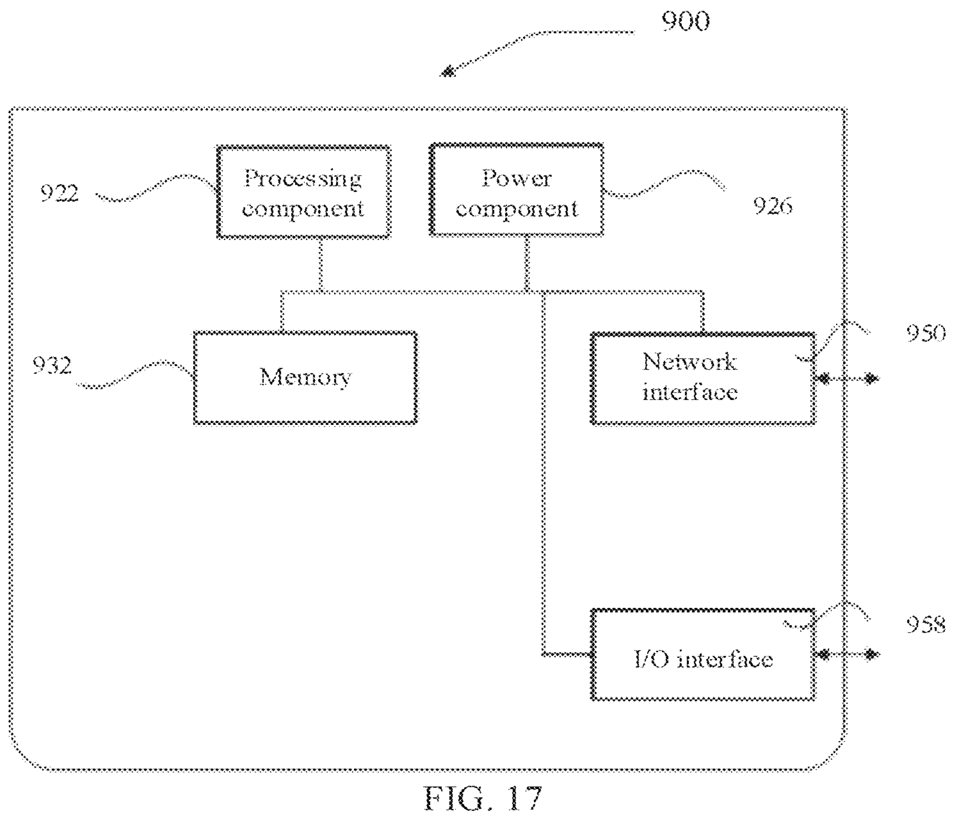
FIG. 17 is a block diagram of a base station illustrated according to an exemplary embodiment.

As shown in FIG. 17, an embodiment of the present disclosure illustrates a structure of a base station. For example, a base station 900 may be provided as a network-side device. Referring to FIG. 17, the base station 900 includes a processing component 922, which further includes one or more processors, and a memory represented by a memory 932 for storing instructions that can be executed by the processing component 922, such as applications. The applications stored in the memory 932 may include one or more modules, each corresponding to a set of instructions. In addition, the processing component 922 is configured to execute instructions to implement the method applied to any method applied in the base station described above.

The base station 900 may further include a power component 926 configured to perform power management of the base station 900, a wired or wireless network interface 950 configured to connect the base station 900 to the network, and an input/output (I/O) interface 958. The base station 900 may operate based on an operating system stored in the memory 932, such as Windows Server™, Mac OS X™, Unix™, Linux™, FreeBSD™ or the like.

Those skilled in the art, after considering the specification and practice of the invention disclosed herein, will readily conceive other embodiments of the invention. The present disclosure is intended to cover any modifications, uses, or adaptations of the invention, which follow general principles of the invention and include common knowledge or conventional techniques in the technical field not disclosed herein. The specification and embodiments are merely exemplary, and the true scope and spirit of the invention are indicated by the following claims.

It will be understood that the invention is not limited to the exact structure described above and shown in the drawings and that various modifications and changes may be made without departing from the scope. The scope of the invention is defined only by the appended claims.

What is claimed is:

1. A method for sending configuration information, performed by a base station, the method comprising:

sending configuration information of a predetermined reference signal, wherein the predetermined reference signal comprises at least one of:

a Tracking Reference Signal (TRS); or a Channel-State Information Reference Signal (CSI-RS); and a field length of an Information Element (IE) for indicating the configuration information is within a predetermined range.

2. The method according to claim 1, further comprising determining the field length based on at least one of:

network configuration information;

a predetermined protocol; or predetermined configuration information.

3. The method according to claim 2, wherein determining the field length based on the network configuration information comprises:

determining, based on a field length indicated by the network configuration information, the field length of the IE for indicating the configuration information; or determining, based on a field length of a predetermined IE indicated by the network configuration information, the field length of the IE for indicating the configuration information.

4. The method according to claim 2, wherein the IE comprises an IE indicating at least one of a starting resource block (startingRB) or a number of resource blocks (nrofRBs), and wherein determining the field length based on the network configuration information comprises determining the field length for indicating at least one of the startingRB or the nrofRBs based on the network configuration information.

5. The method according to claim 2, wherein the IE comprises an IE indicating an nrofRBs, and wherein determining the field length based on the network configuration information comprises at least one of:

determining the field length for indicating the nrofRBs based on a minimum number of RBs occupied by the predetermined reference signal indicated by the network configuration information; or determining the field length for indicating the nrofRBs based on a number of RBs included in a bandwidth of a predetermined control resource set indicated by the network configuration information.

6. The method according to claim 2, wherein the IE comprises an IE indicating a startingRB, and wherein determining the field length based on the network configuration information comprises at least one of:

determining the field length for indicating the startingRB based on a minimum number of RBs occupied by the predetermined reference signal indicated by the network configuration information; or determining the field length for indicating the startingRB based on a number of RBs included in a bandwidth of a predetermined control resource set indicated by the network configuration information.

7. The method according to claim 2, wherein the IE comprises an IE indicating at least one of a startingRB or an nrofRBs, and wherein determining the field length based on the predetermined protocol comprises:

determining the field length for indicating at least one of the startingRB or the nrofRBs to be a first value based on the predetermined protocol; or determining the field length for indicating the nrofRBs to be a second value based on the predetermined protocol; or determining the field length for indicating the startingRB to be a third value based on the predetermined protocol.

8. The method according to claim 2, wherein the IE comprises an IE indicating periodicity and offset (periodicity AndOffset), and wherein determining the field length based on the predetermined configuration information comprises determining the field length for indicating the periodicity AndOffset based on a number of candidate sets indicated by the predetermined configuration information.

9. The method according to claim 2, further comprising: performing joint encoding of different IEs for indicating the configuration information.

10. The method according to claim 9, wherein a number of continuous RBs occupied by the TRS is less than a number of RBs included in a bandwidth of a predetermined control resource set.

11. The method according to claim 10, wherein determining the field length based on the predetermined protocol comprises:

determining the field length of the IE indicating a joint encoding result of a startingRB and an nrofRBs to be a fourth value based on the predetermined protocol.

12. The method according to claim 9, wherein a number of continuous RBs occupied by the TRS is greater than a predetermined number of RBs and less than a number of RBs included in a bandwidth of a predetermined control resource set.

13. The method according to claim 12, wherein determining the field length based on the predetermined protocol comprises:

determining the field length of the IE indicating a joint encoding result of a startingRB and an nrofRBs to be a fifth value based on the predetermined protocol.

14. A communication device comprising:

a memory; and a processor connected to the memory and configured to implement the method according to claim 1 by executing computer-executable instructions stored on the memory.

15. A non-transitory computer-readable storage medium storing computer-executable instructions which, when executed by a processor, cause the processor to implement the method according to claim 1.

16. A method for receiving configuration information, performed by a terminal, the method comprising:

receiving configuration information of a predetermined reference signal, wherein the predetermined reference signal comprises at least one of:

a Tracking Reference Signal (TRS); or a Channel-State Information Reference Signal (CSI-RS); and a field length of an Information Element (IE) for indicating the configuration information is within a predetermined range.

17. A communication device comprising:

a memory; and a processor connected to the memory and configured to implement the method according to claim 16 by executing computer-executable instructions stored on the memory.

18. A non-transitory computer storage medium storing computer-executable instructions which, when executed by a processor, cause the processor to implement the method according to claim 16.

* * * * *